US012277075B2

(12) United States Patent
Putti et al.

(10) Patent No.: US 12,277,075 B2
(45) Date of Patent: Apr. 15, 2025

(54) MEMORY REQUEST PRIORITY UP-LEVELING

(71) Applicant: Google LLC, Mountain View, CA (US)

(72) Inventors: Nagaraj Ashok Putti, Bangalore (IN); Gopi Neela, Bengaluru (IN); Shubham Mahajan, Bangalore (IN); Praxal Sunilkumar Shah, Ahmedabad (IN)

(73) Assignee: Google LLC, Mountain View, CA (US)

( * ) Notice: Subject to any disclaimer, the term of this patent is extended or adjusted under 35 U.S.C. 154(b) by 18 days.

(21) Appl. No.: 18/251,672

(22) PCT Filed: Nov. 5, 2020

(86) PCT No.: PCT/US2020/059061
§ 371 (c)(1),
(2) Date: May 3, 2023

(87) PCT Pub. No.: WO2022/098356
PCT Pub. Date: May 12, 2022

(65) Prior Publication Data
US 2024/0012771 A1    Jan. 11, 2024

(51) Int. Cl.
*G06F 13/16* (2006.01)
(52) U.S. Cl.
CPC .............. *G06F 13/1673* (2013.01)
(58) Field of Classification Search
None
See application file for complete search history.

(56) References Cited

U.S. PATENT DOCUMENTS 8,690,475 B2 * 4/2014 Springer .............. E02D 3/026
404/121
9,405,688 B2    8/2016 Nagarajan et al.
(Continued)

FOREIGN PATENT DOCUMENTS

CN    103914412 A    7/2014
CN    106445628      2/2017
(Continued)

OTHER PUBLICATIONS

"International Preliminary Report on Patentability", Application No. PCT/US2020/059061, May 8, 2023, 7 pages.
(Continued)

*Primary Examiner* — Elias Mamo
(74) *Attorney, Agent, or Firm* — Colby Nipper PLLC

(57) ABSTRACT

The described techniques and apparatuses enable memory-request priority up-leveling. A memory request is received over a virtual channel, VC, and is then added to a memory-request buffer with an original priority-level for the memory request and an indication that the memory request is associated with a virtual channel identification, VCID, of the VC. Related memory requests within the memory-request buffer are also indicated as being associated with the VCID. Responsive to determining that an up-level indication for the VCID is asserted over a side channel, the original priority-levels of the memory request, and other memory-requests in the memory-request buffer having an indication of the VCID, are increased to respective up-leveled priority levels. Responsive to determining that the up-level indication is no longer asserted, the up-leveled priority levels are returned to respective original priority-levels.

20 Claims, 6 Drawing Sheets

(56) References Cited

U.S. PATENT DOCUMENTS

| | | |
|---|---|---|
| 9,535,860 B2 | 1/2017 | Cutter et al. |
| 10,223,298 B2 * | 3/2019 | Chhabra et al. |
| 10,250,510 B2 * | 4/2019 | Sridharan ............... H04L 47/24 |
| 10,838,884 B1 * | 11/2020 | Magudilu Vijavaraj ..................... G06F 13/161 |
| 11,003,602 B2 * | 5/2021 | Walker .................... G06F 13/26 |
| 2005/0058130 A1 * | 3/2005 | Christ ..................... H04L 47/16 370/389 |
| 2012/0311277 A1 | 12/2012 | Chu et al. |
| 2015/0317266 A1 * | 11/2015 | Kramer ............... G06F 13/1673 710/310 |
| 2016/0364303 A1 | 12/2016 | Gilda et al. |
| 2018/0210847 A1 | 7/2018 | Walker |
| 2019/0012209 A1 | 1/2019 | Chiou et al. |
| 2019/0012290 A1 | 1/2019 | Watanabe |
| 2020/0285420 A1 * | 9/2020 | Guim Bernat ........ G06F 3/0659 |
| 2020/0301859 A1 | 9/2020 | Chin |

FOREIGN PATENT DOCUMENTS

| | | |
|---|---|---|
| CN | 110214316 A | 9/2019 |
| JP | 2020154697 A | 9/2020 |
| TW | 201635150 | 10/2016 |
| TW | 201702882 | 1/2017 |
| WO | 2022098356 | 5/2022 |

OTHER PUBLICATIONS

"International Search Report and Written Opinion", Application No. PCT/US2020/059061, May 25, 2021, 10 pages.

"Foreign Office Action", CN Application No. 202080106238.6, Sep. 5, 2024, 18 pages.

\* cited by examiner

MEMORY REQUEST PRIORITY UP-LEVELING

BACKGROUND

Modern computing devices process large numbers of read and write memory requests from requesting clients (e.g., operating systems, applications, or components). Because the memory requests cannot all be served on a next cycle of a computing device, the memory requests are often placed in a memory-request buffer, and an arbiter grants (or declines) the memory requests based on an arbitration scheme.

Priority levels, which affect quality of service for requesting clients, are often used for memory-request arbitration. Clients may have various requirements that dictate respective priorities of the memory requests they generate. By utilizing priority levels, the arbiter can prioritize memory requests within the memory-request buffer for granting.

Traditionally, priority levels may be fixed for each memory request in the memory-request buffer. While this approach can effectively indicate that memory requests have different priorities, it cannot adapt when clients' requirements change. For example, a video card may determine that a display buffer is about to underrun and may have no means to expedite associated memory requests.

SUMMARY

Techniques and apparatuses are described that enable memory-request priority up-leveling. These techniques and apparatuses enable a client to dynamically adjust priority levels of memory requests within a memory-request buffer (e.g., read and/or write memory requests) via a side channel to a memory controller. By asserting an up-level indication corresponding to a virtual channel identification (VCID) over the side channel, the client can increase original priority-levels for memory requests within the memory-request buffer for which the VCID is indicated. Furthermore, because the VCID is indicated for related memory requests, priority up-leveling may be achieved while accounting for memory request dependency.

Aspects described below include a memory controller configured to perform a method that receives a memory request from a client over a virtual channel (VC) and adds the memory request to a memory-request buffer, along with an indication of a VCID of the VC and an original priority-level for the memory request. The method then indicates the VCID for related memory requests within the memory-request buffer. The method also determines that an up-level indication corresponding to the VCID is being asserted and, based on the up-level indication being asserted, increases original priority-levels of memory requests with the VCID indicated (e.g., the memory request and the related memory requests) to respective up-leveled priority levels. The memory controller may implement the method in hardware (e.g. using digital logic circuitry configured to perform the method) or in a combination of hardware and software (e.g., by a processor and a computer-readable medium, where the medium includes instructions that cause the processor to perform the method).

Aspects described below also include a method performed by a memory controller. The method includes receiving a memory request from a client over a VC and adding the memory request to a memory-request buffer along with an indication of a VCID of the VC and an original priority-level for the memory request. The method also includes indicating the VCID for related memory requests within the memory-request buffer. The method further includes determining that an up-level indication corresponding to the VCID is being asserted and, based on the up-level indication being asserted, increasing original priority-levels with the VCID indicated (e.g., the memory request and the related memory requests) to respective up-leveled priority levels.

BRIEF DESCRIPTION OF THE DRAWINGS

Apparatuses and techniques enabling memory-request priority up-leveling are described with reference to the following drawings. The same numbers are used throughout the drawings to reference like features and components.

DETAILED DESCRIPTION

Overview

Memory requests may have associated priority levels that affect quality of service for clients. Although the clients may be able to set priority levels when the memory requests are generated, the priority levels are generally static and unable to be manipulated by the clients after the memory requests are received by a memory controller. Some memory controllers can accelerate memory requests; they often do so, however, irrespective of the clients. Many times, the clients are aware of conditions that the memory controller is not (e.g., a local buffer that is about to underrun). Such conditions can lead to poor quality-of-service for the clients, even with memory-controller-based acceleration. Furthermore, traditional acceleration techniques may fail to account for related memory requests within the memory-request buffer (e.g., memory-request dependency). Failing to account for such dependency can also lead to poor quality of service for the clients due to parent memory requests holding up child memory requests even when the child memory requests are accelerated by the memory controller.

This document describes techniques and apparatuses that enable memory-request priority up-leveling. These techniques and apparatuses enable a client to dynamically adjust priority levels of memory requests within a memory-request buffer via a side channel to a memory controller. By asserting an up-level indication corresponding to a VCID over the side channel, the client can increase original priority-levels for memory requests within the memory-request buffer that have the VCID indicated. In some cases, the up-leveling may occur in as little as a single clock cycle. Furthermore, because the VCID is indicated for related memory requests, priority up-leveling may be achieved while accounting for memory request dependency. Although the following discussion describes acceleration of memory requests through priority up-leveling, the techniques can easily be applied to deceleration of memory requests though priority down-leveling.

Example Process Flows

Figure 1:
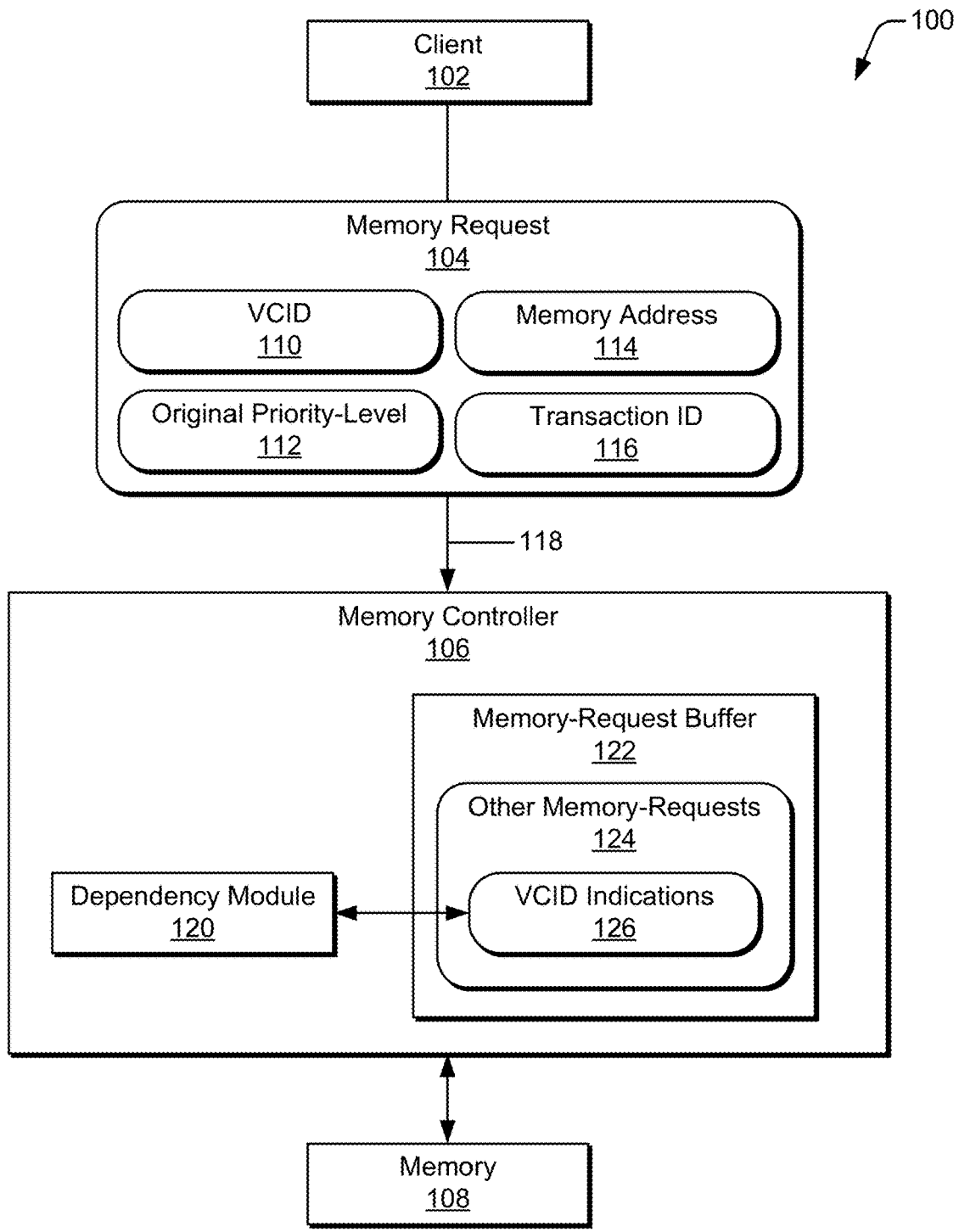
FIG. 1 illustrates an example process flow for adding memory requests to a memory-request buffer and indicating VCIDs for related memory requests.

FIG. 1 illustrates an example process flow 100 for adding memory requests to a memory buffer and indicating VCIDs for related memory requests. The process flow 100 is generally implemented in an electronic device (not shown) that is discussed below in regard to FIG. 3. As shown in FIG. 1, the process flow 100 includes a client 102 that sends a memory request 104 (e.g., read and/or write memory request) to a memory controller 106. The client 102 may be a component or aspect of an application, operating system, processor, core of a processor, piece of hardware, or any other entity that can generate memory requests requesting to read from or write to a memory 108.

The memory request 104 has a VCID 110 associated with the memory request 104, an original priority-level 112, a memory address 114, and an optional transaction identification (ID) 116. The memory address 114 indicates a physical or virtual memory address associated with the memory request 104. Although discussed in terms of a memory address 114, the memory request 104 may include a request for a plurality of memory addresses. The transaction ID 116 may be included in the memory request 104 and may be used for memory request dependency, as discussed below.

The original priority-level 112 may indicate a priority of the memory request 104 that is dictated by the client and used for memory request arbitration. Some clients, (e.g., a real-time client) may generate high-priority memory requests compared to other clients (e.g., a non-real-time client). The original priority-level 112, for example, may be a value in a range from 1 to 10.

The memory request 104 is received by the memory controller 106 over a VC 118, and the VCID 110 corresponds to the VC 118. Thus, the VCID 110 of the memory request 104 may be inherent to the memory controller 106 based on the VC 118. The VC 118 may also be associated with the client. For example, the VC 118 (and thus the VCID 110) may be determined based on information about the client 102 (e.g., ID, type, or location). Alternatively, the memory request 104 may explicitly contain the VCID 110 corresponding to the VC 118. Regardless of how the VCID 110 is determined, the memory controller 106 adds the memory request 104 to a memory-request buffer 122 along with an indication of the VCID 110.

Noted that the system may have a fixed number of VCs and, thus, a fixed number of VCIDs over which memory requests may be received. Because of the multiple VCs, the memory controller 106 may utilize multiplexing of incoming memory requests. As the VCs are virtual, two or more of the VCs (including all of the VCs) may share a common physical channel. Furthermore, multiple clients can share a VC (and thus send memory requests over a same VCID). Conversely, a client may utilize multiple VCs (and thus send memory requests with different VCIDs).

A dependency module 120 of the memory controller 106 may analyze other memory-requests 124 within the memory-request buffer 122 that were previously added with corresponding VCID indications 126 and determine if any related memory requests exist. In order to find related memory requests (e.g., parent memory requests), the dependency module 120 may search for memory addresses or transaction IDs of the other memory-requests 124 that match those of the memory request 104.

The other memory-requests 124 have respective VCID indications 126 that were indicated upon entering the memory-request buffer 122 (similar to the memory request 104). If a related memory request exists in the memory-request buffer 122, the dependency module 120 determines if the VCID 110 is indicated for the related memory request. The VCID indications 126 of the other memory-requests 124 may be for the VCID 110 or other VCIDs supported by the system. For example, if the related request was received over the VC 118, then the VCID 110 may already be indicated for the related request. If, however, the VCID 110 is not already indicated for the related memory request (e.g., the related memory request was received over a different VC and thus has a different VCID indicated), then the dependency module 120 may indicate the VCID 110 for the related memory request. The indication of the VCID 110 for the related memory request is additive and not a replacement indication. As such, the related memory request will be associated with the VCID 110 as well as a VCID for a VC over which the related memory request was received (if different than the VC 118).

The dependency module 120 may assign/indicate the VCID indications 126 of the other memory-requests 124 (including the memory request 104 after being added to the memory-request buffer 122) via a field for each memory request. The field may have a width equal to a number of VCs supported by the system. In some implementations, a vector may be used to represent the field (e.g., a VCID vector). The field may be part of a lookup table that contains the memory requests, or the field may be attached or appended to each of the memory requests. By using the field, each memory request in the memory-request buffer 122 may have indications of each of the VCIDs of the system. Although the memory request 104 has been described as being added to the memory-request buffer 122 prior to actions of the dependency module 120, the memory request 104 may be added to the memory-request buffer 122 concurrently with or after the actions of the dependency module 120.

By performing such actions, each memory request within the memory-request buffer 122 includes an indication of at least one VCID corresponding to the VC over which the respective memory request was received along with indications of VCIDs of any related memory requests (e.g., children of the respective memory request). By indicating VCIDs of children memory requests for parent memory requests (e.g., by the dependency module 120), a VCID may be used to priority up-level not only memory requests that were received over the corresponding VC, but also related memory requests (e.g., parents of the memory requests that were received over the corresponding VC). Priority up-leveling is discussed further below in regard to FIG. 2.

Figure 2:
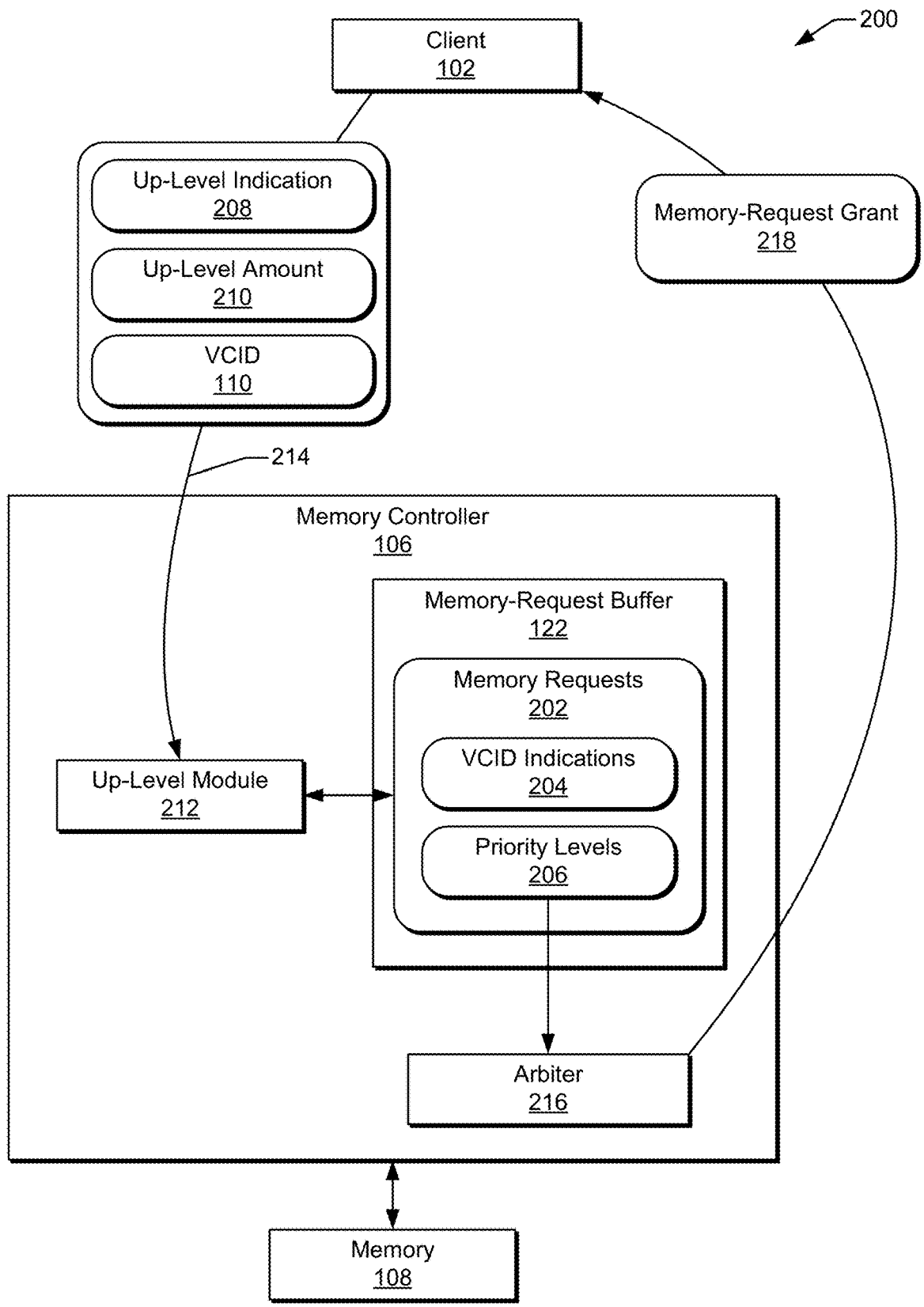
FIG. 2 illustrates an example process flow for memory-request priority up-leveling.

FIG. 2 illustrates an example process flow 200 for memory-request priority up-leveling. The process flow 200 is generally a continuation of the process flow 100 and, thus, may also be implemented in the electronic device (not shown) that is discussed below in regard to FIG. 3. The process flow 200 generally occurs after the process flow 100. As such, the process flow 200 occurs after the dependency module 120 has placed the memory request 104 within the memory-request buffer 122 and indicated the VCID 110 for any related requests. Thus, memory requests 202 include memory request 104 and the other memory-requests 124 along with their corresponding VCID indications 204 and priority levels 206.

As shown, the process flow 200 includes the client 102 asserting an up-level indication 208 with a corresponding up-level amount 210 for the VCID 110 for receipt by an up-level module 212 of the memory controller 106. The up-level indication 208 and the up-level amount 210 are received over a side channel 214 to the memory controller 106. The side channel 214 may be a different channel than that over which the memory requests 202 were received. In this way, the up-leveling is asynchronous with the memory requests 202. Other side channels may exist for the other VCIDs. Similar to the VCs for which they pertain, the respective side channels may share a common physical channel.

As will be discussed further below, the up-level module 212 may consider the up-level indication 208 as being asserted until it is changed or deasserted by the client 102. Furthermore, although the same client (e.g., the client 102) as in FIG. 1 is shown, noted that the up-level indication 208 may be asserted and the up-level amount 210 set by another client. For example, the other client may have one or more memory requests 202 that were received over VC 118.

The VCID 110 associated with the up-level indication 208 and the up-level amount 210 may, similar to the memory request 104, be inherent to the memory controller 106 based on a VC over which the up-level indication 208 is received (e.g., a VC of the side channel 214). In such a situation, the VCID 110 may be inherent to the up-level module 212. Alternatively, the up-level indication 208 and the up-level amount 210 may be received along with an explicit indication of the VCID 110.

The up-level module 212 searches the memory requests 202 within the memory-request buffer 122 for indications of the VCID 110. As mentioned above, in addition to the memory request 104, at least some of the memory requests 202 that were received over the same VC as the memory request 104, along with at least some of the memory requests 202 that are related to the memory request 104, may include an indication of the VCID 110.

Respective priority levels 206 of the memory requests 202 having the indication of the VCID 110 are increased from respective original priority-levels (e.g., original priority-level 112) to respective up-leveled priority levels based on the up-level amount 210. The up-level amount 210 may be a fixed amount, e.g., the priority levels 206 of the memory requests 202 having the indication of the VCID 110 are set to a specific level. Alternatively, the up-level amount 210 may be a multiplier, e.g., the priority levels 206 of the memory requests 202 having the indication of the VCID 110 are multiplied by the multiplier.

The up-level indication 208 is a dynamic indication that can be easily asserted or deasserted by the client 102. As such, when the client 102 asserts the up-level indication 208, e.g., by setting a bit of the side channel 214, priority levels of associated requests are increased. The priority levels of the associated requests may stay increased until the up-level indication is deasserted by the client, e.g., by returning the bit. Accordingly, responsive to determining that the up-level indication 208 for the VCID 110 has been deasserted by the client 102, the up-level module 212 returns the priority levels 206 of the memory requests 202 having the indication of the VCID 110 to the respective original priority-levels. Furthermore, the up-level amount 210 can be changed dynamically by the client 102 (or another requesting client) irrespective of whether the up-level indication 208 is currently asserted and/or being received. Noted that the changes in priority levels, and thus acceleration/deceleration, may occur in as little as a single clock cycle.

The priority levels 206 are sent to and/or viewed by an arbiter 216 that grants the memory request 104 based on the priority level of the memory request 104 (or, because priority level is only one factor for use in memory-request arbitration, the arbiter 216 may decline or defer the memory request 104). The arbiter 216 may grant the memory request 104 while the up-level indication 208 is asserted or deasserted. Generally, the arbiter 216 is more likely to grant the memory request 104 while the priority level of the memory request 104 is up-leveled. The memory request 104, however, may be granted after the up-level indication 208 is deasserted. Thus, the priority level for the memory request 104 at grant may be the original priority-level 112 or an up-leveled priority level. Regardless of the priority level when the memory request 104 is granted, the arbiter sends a memory-request grant 218 that corresponds to the memory request 104 to the client 102. Other memory-requests of the memory requests 202 (including the related memory requests that are generally granted prior to the memory request 104) also have associated memory grants sent to their respective clients.

In order to accommodate the multiple VCs of the system, the memory controller 106 may utilize multiplexing for one or more operations. For example, up-level indications asserted over VC 214 may be multiplexed with up-level indications asserted over other VCs. As such, the up-level module 212 may multiplex up-leveling of memory requests over multiple VCs. Similarly, the priority levels 206 may be multiplexed when viewed/analyzed by the arbiter 216.

By utilizing the above techniques, performance of the memory controller 106 may not be affected by increasing a depth of the memory request buffer 122 (e.g., a number of memory requests able to be stored/tracked in the buffer). For example, a number of the operations discussed above may be irrespective of the depth. Furthermore, increasing the depth of the memory request buffer 122 may merely require a linear growth in area (as opposed to exponential or some other non-linear growth). Also, there may be no need to maintain additional pointers for the parent memory transactions.

Example Device

Figure 3:
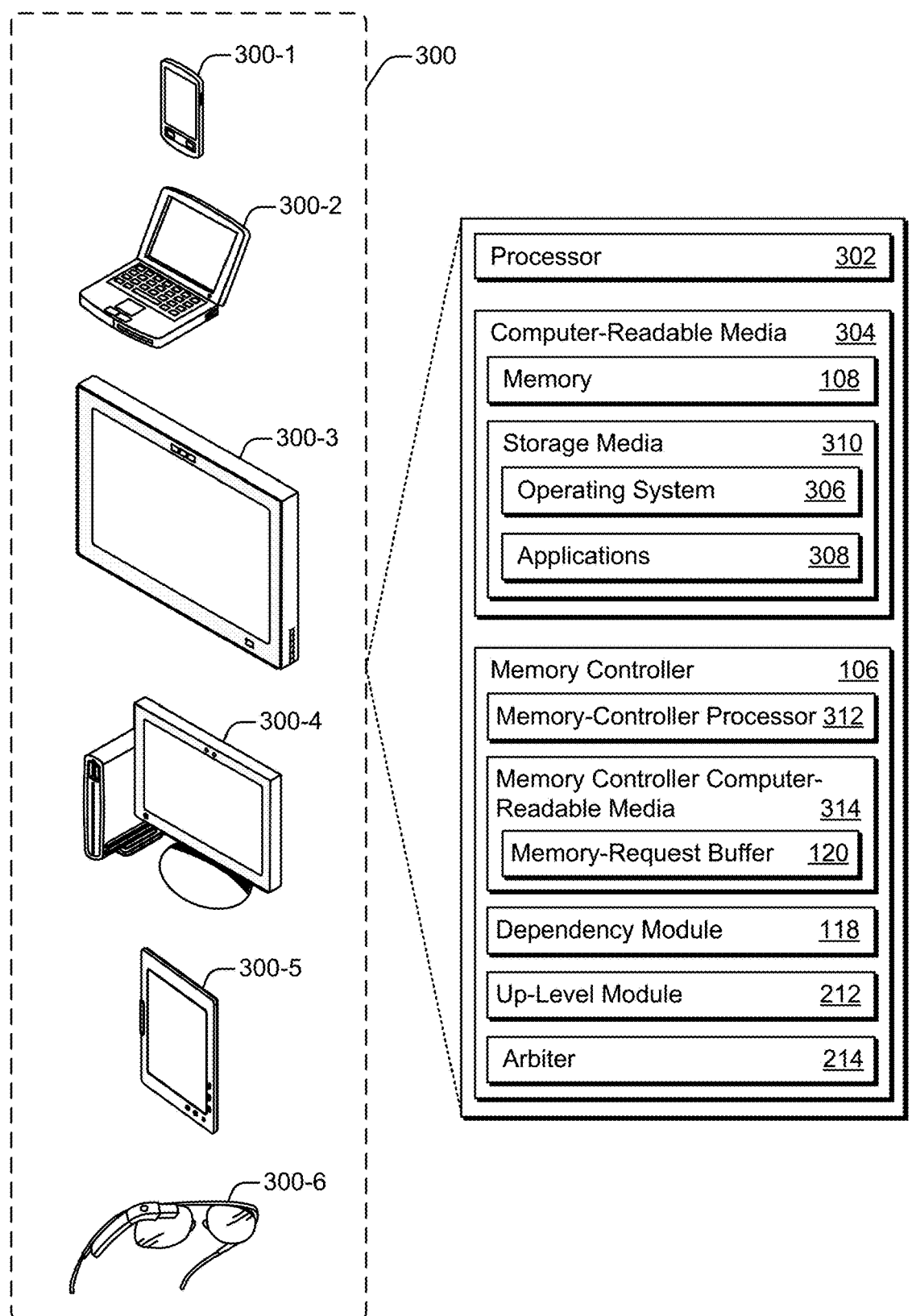
FIG. 3 illustrates an example electronic device in which memory-request priority up-leveling can be implemented.

FIG. 3 illustrates an example electronic device 300 in which memory-request priority up-leveling can be implemented. The electronic device 300 is illustrated with various non-limiting examples of the electronic device 300: a smartphone 300-1, a laptop 300-2, a television 300-3, a desktop 300-4, a tablet 300-5, and a wearable device 300-6. As shown on the right, the electronic device 300 includes at least one processor 302, computer-readable media 304, and the memory controller 106.

The processor 302 (e.g., an application processor, microprocessor, digital-signal processor (DSP), or controller) executes code stored within the computer-readable media 304 to implement an operating system 306 and optionally one or more applications 308 that are stored within a storage media 310 (e.g., one or more non-transitory storage devices such as a hard drive, SSD, flash memory, read-only memory (ROM), EPROM, or EEPROM) of the computer-readable media 304. Although the operating system 306 or the applications 308 generally act as the client 102, as described below, other components can also generate the memory request 104.

The computer-readable media 304, which may be transitory or non-transitory, also includes the memory 108 (e.g., one or more non-transitory computer-readable storage devices such as a random access memory (RAM, DRAM, or SRAM)) that is requested to be accessed (e.g., read from or written to) by the client 102 through the memory request 104.

The memory controller 106 contains a memory-controller processor 312 and a memory controller computer-readable media 314. The memory-controller processor 312 (e.g., an application processor, microprocessor, digital-signal processor (DSP), or controller) executes code stored within the memory controller computer-readable media 314 to implement the dependency module 120 and the up-level module 212 that are implemented at least partially in hardware of the memory controller 106. The memory controller computer-readable media 314 (e.g., one or more non-transitory storage devices) also includes the memory-request buffer 122. The memory controller 106 also contains the arbiter 216.

Although described in terms of a separate processing system (e.g., with a separate processor and separate computer-readable media), aspects of the memory controller 106 may be implemented in conjunction with the processor 302 or by the processor 302. Similarly, the memory controller 106 (or processor 302) may perform functions described herein by executing instructions that are stored within the storage media 310. The memory 108 and aspects of the memory controller 106 may also be combined (e.g., implemented as part of an SoC).

Although the memory controller 106 is described in terms of memory requests to access the memory 108, the techniques described herein can easily be applied for memory requests to access storage media 310. For example, the memory controller 106 may be a hard drive controller, SSD controller, or the like. Alternatively, the memory controller 106 may be implemented by the processor 302 to access storage media 310.

The electronic device 300 can include one or more communication systems (not shown) that enable wired and/or wireless communication of device data, such as received data, transmitted data, or other information as described above. Example communication systems include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, infrared (IR) transceivers compliant with an Infrared Data Association (IrDA) protocol, and wired local area network (LAN) Ethernet transceivers. In some cases, aspects of the communication system may act as the client 102 by generating memory requests based on received data or data to be transmitted (e.g., a communication buffer).

The electronic device 300 may also include one or more data input ports (not shown) by which any type of data, media content, and/or other inputs can be received (e.g., user-selectable inputs, messages, applications, music, television content, recorded video content, and any other type of audio, video, and/or image data received from any content and/or data source). The data input ports may include USB ports, coaxial cable ports, fiber optic ports for optical fiber interconnects or cabling, and other serial or parallel connectors (including internal connectors) for flash memory, DVDs, CDs, and the like. These data input ports may be used to couple the electronic device to components, peripherals, or accessories such as keyboards, microphones, or cameras, and may also act as the client 102 by which the memory request 104 is received (e.g., the memory request is generated by a remote device).

Although not shown, the electronic device 300 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

In some implementations, the electronic device 300 also includes an audio and/or video-processing system (not shown) that processes audio data and/or passes through the audio and video data to an audio system (not shown) and/or to a display system (not shown) (e.g., a video buffer or a screen of a smart phone or camera). The audio system and/or the display system may include any components that process, display, and/or otherwise render audio, video, display, and/or image data and may act as the client 102. Display data and audio signals can be communicated to an audio component and/or to a display component via an RF (radio frequency) link, S-video link, HDMI (high-definition multimedia interface), composite video link, component video link, DVI (digital video interface), analog audio connection, or another similar communication link, such as the media data port. In some implementations, the audio system and/or the display system are external or separate components of the electronic device 300. Alternatively, the display system can be an integrated component of the example electronic device 300, such as part of an integrated touch interface.

Example VCID Indications

Figure 4:
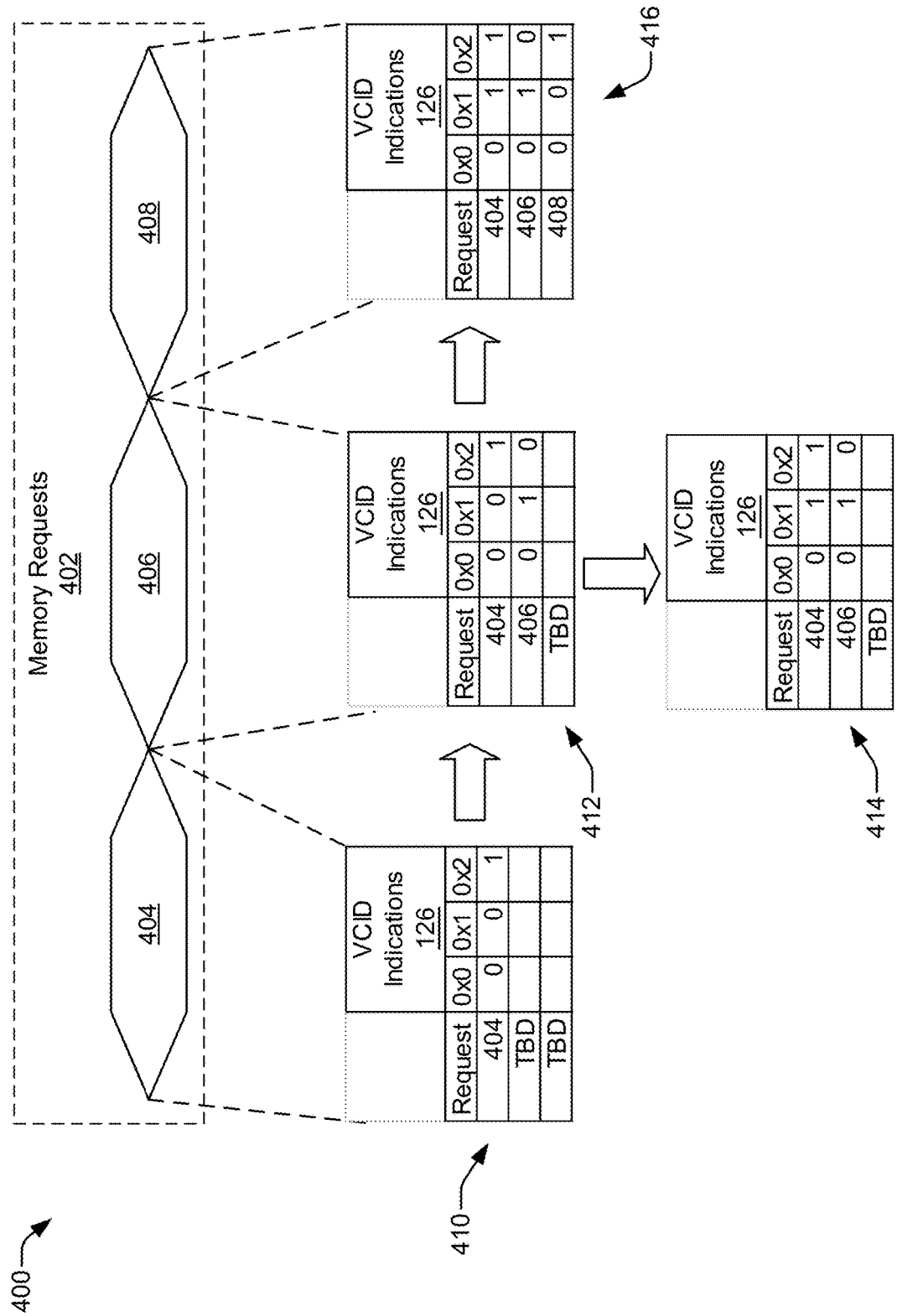
FIG. 4 is an example illustration of VCIDs being indicated for memory requests.

FIG. 4 is an example illustration 400 of VCIDs being indicated for memory requests. The example illustration 400 shows VCID indications 126 for three memory requests 402 (memory request 404, memory request 406, and memory request 408) that are received chronologically (e.g., memory request 404 is received first, memory request 406 is received second, and memory request 408 is received third). The memory requests 402 are generally similar to the memory request 104 when first received and then similar to the other memory-requests 124 after the memory requests are placed in the memory-request buffer 122. The VCID indications 126 are shown as 0x0, 0x1, and 0x2 merely for display purposes. As discussed above, any number of VCID indications 126 in any fashion (e.g., table, vector, field, etc.) may be utilized.

The memory request 404 is received over a VC with a VCID of 0x2. As such, when added to the memory-request buffer 122, VCID 0x2 is indicated for the memory request 404, as shown in an example representation 410 of the memory-request buffer 122. Next, the memory request 406 is received over a VC with a VCID of 0x1. As such, when added to the memory-request buffer 122, VCID 0x1 is indicated for the memory request 406, as shown in an example representation 412 of the memory-request buffer 122. The memory request 406 is related to the memory request 404 (based on transaction IDs and/or memory addresses). More specifically, the memory request 406 is determined to be dependent upon memory request 404 (e.g., memory request 406 is a child of memory request 404). Accordingly, the dependency module 120 from FIG. 1 indicates VCID 0x1 for the memory request 404, as shown in an example representation 414 of the memory-request buffer 122. As noted above, the change in VCID indications 126 for the memory request 404 may be performed prior to, concurrently with, or after the memory request 406 is added to the buffer. The change from example representation 412 to example representation 414 is merely illustrative of the change due to memory request dependency.

Subsequently, the memory request 408 is received over the VC with the VCID of 0x2. The memory request 408 is not related to memory request 404 or 406. As such, when added to the memory-request buffer 122, VCID 0x2 is indicated for the memory request 408, as shown in an example representation 416 of the memory-request buffer 122. Accordingly, after the memory request 408 has been placed in the memory-request buffer 122, an up-level indication for VCID 0×0 does not up-level any of the memory requests 404, 406, or 408. Similarly, an up-level indication for VCID 0×1 up-levels the memory request 404 and the memory request 406. Also, an up-level indication for VCID 0×2 up-levels the memory request 404 and the memory request 408.

Because of the indication of VCID 0×1 for the memory request 404 (which was received over a different VC than that of VCID 0×1), the priority level of the memory request 404 is up-leveled responsive to an up-level indication for VCID 0×1 (e.g., to up-level a priority level of the memory request 406). Without accounting for memory request dependency, the priority level of the memory request 404 may not be up-leveled responsive to the up-level indication for VCID 0×1, resulting in the memory request 406 waiting until the memory request 404 is granted and potentially nullifying the up-leveled priority of the memory request 406.

Example Method

Figure 5:
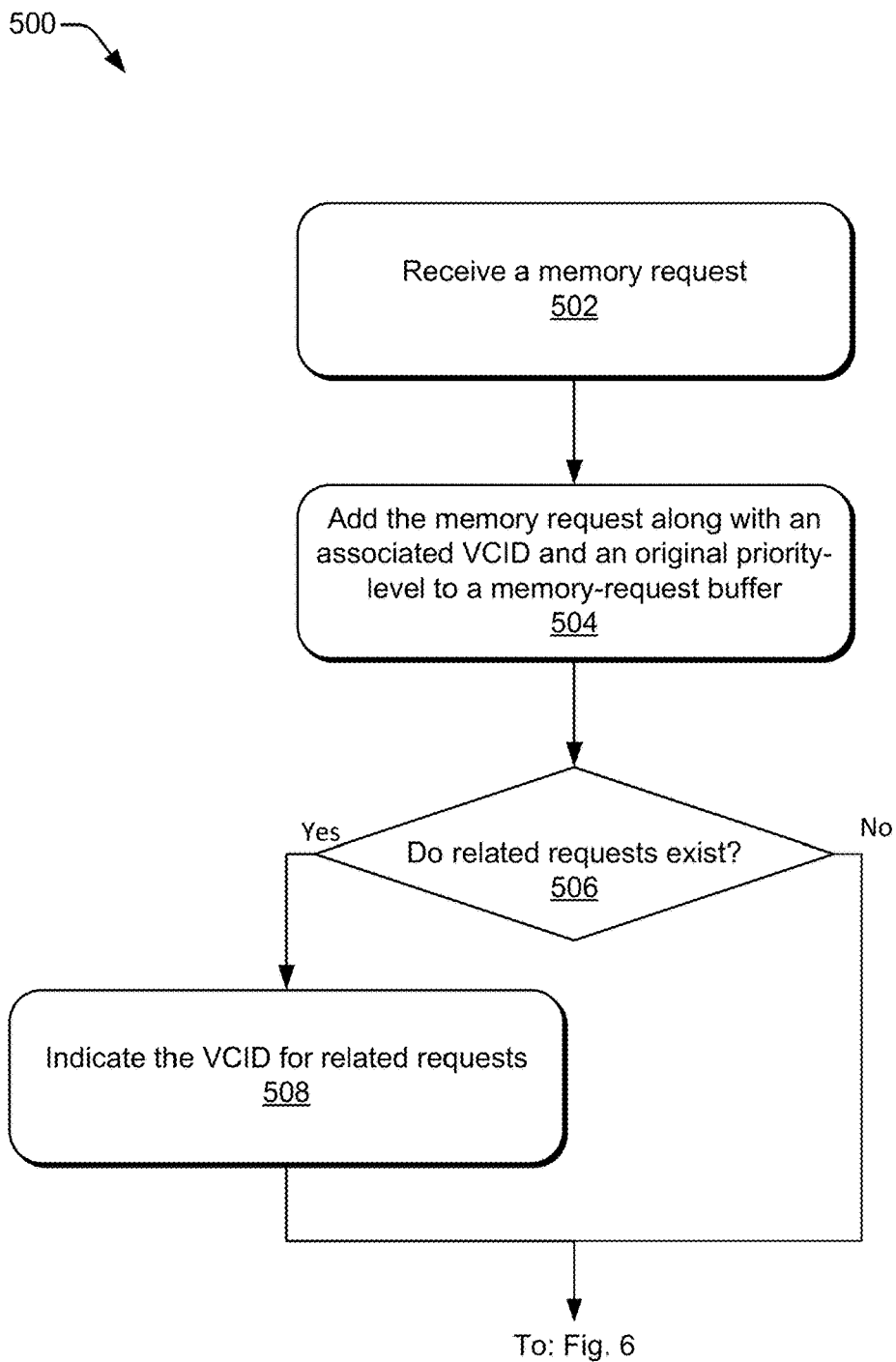
FIGS. 5 and 6 illustrate an example method for memory-request priority up-leveling.
Figure 6:
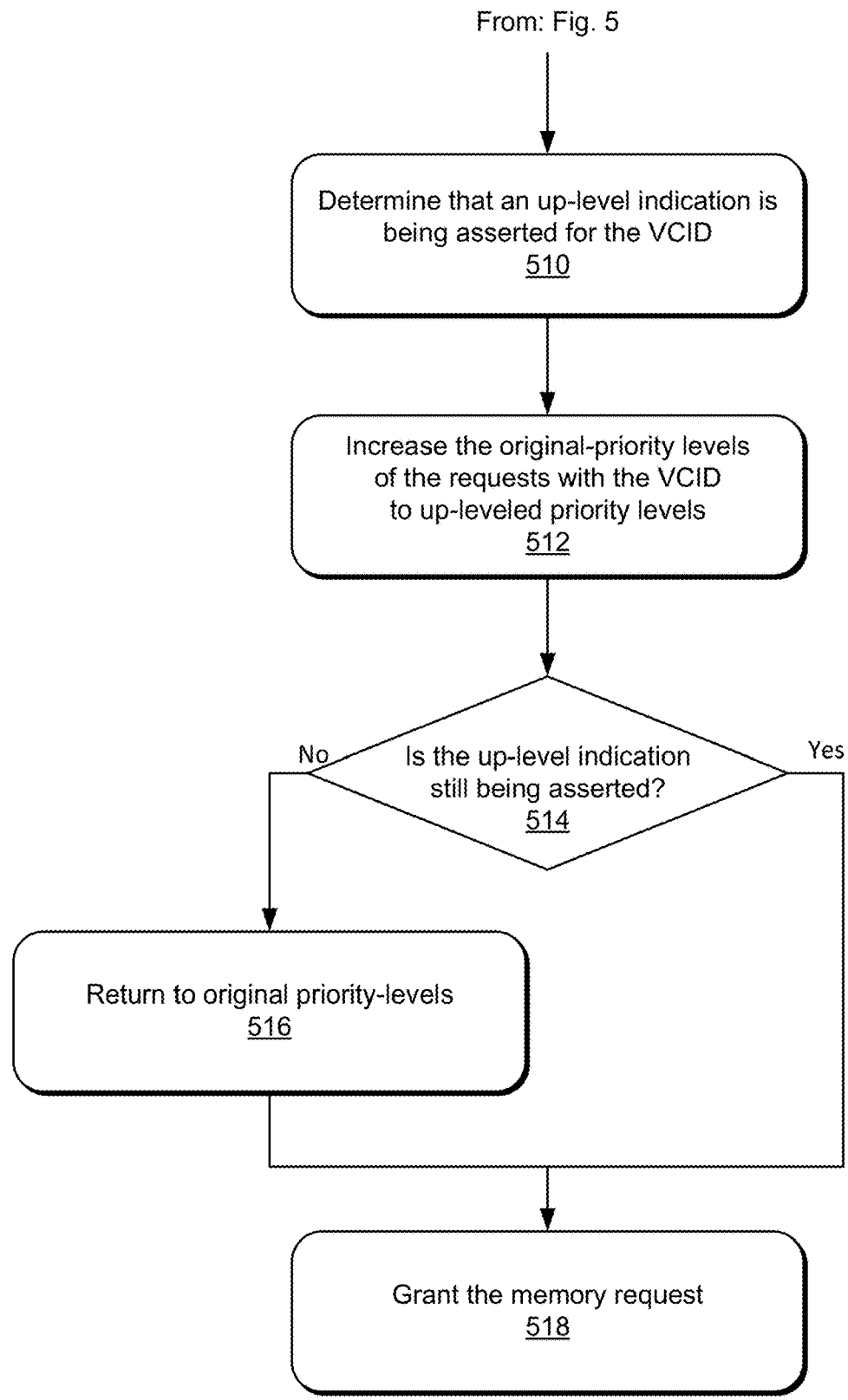

The following discussion describes a method for memory-request priority up-leveling. This method can be implemented utilizing the previously described examples, such as the process flow 100, the process flow 200, the electronic device 300, and the illustration 400 shown in FIG. 4. Aspects of the method 500 are illustrated in FIGS. 5 and 6, which are shown as operations 502 through 518 performed by one or more entities (e.g., memory controller 106). The order in which operations of this method are shown and/or described is not intended to be construed as a limitation, and any number or combination of the described method operations can be combined in any order to implement a method or an alternate method.

FIGS. 5 and 6 illustrate an example method 500 for memory-request priority up-leveling. At 502, a memory request is received. For example, the memory controller 106 may receive the memory request 104 from the client 102 over a VC with the VCID 110 and may contain the original priority-level 112, the memory address 114, and optionally the transaction ID 116.

At 504, the memory request, the VCID and the original priority-level are added to a memory-request buffer. For example, the memory controller 106 may add the memory request 104 to the memory-request buffer 122 with the original priority-level 112 and the VCID 110 indicated.

At 506, contents of the memory-request buffer are analyzed to determine if one or more related memory requests exist. For example, the dependency module 120 may compare transaction IDs or memory addresses of the other memory-requests 124 within the memory-request buffer 122 to those of the memory request 104. If the dependency module 120 identifies a related request ("YES" at 506), then at 508, the dependency module 120 indicates the VCID 110 for the related memory requests. For example, the dependency module 120 may indicate the VCID 110 within the VCID indications 126 of the other memory-requests 124 that are related to the memory request 104. In some implementations, this may involve marking the VCID 110 of the memory request 104 within a corresponding VCID vector of the related/dependent memory requests (e.g., by setting a vector component within the VCID vector).

If the dependency module 120 does not identify related memory requests ("NO" at 506), then the process continues to step 510. Although illustrated as subsequent to step 504, steps 506 and 508 may occur concurrently with or prior to step 504.

At 510, a determination that the up-level indication is being asserted for the VCID is made. For example, the up-level module 212 may determine that the up-level indication 208 is being asserted for the VCID 110. The up-level indication may be asserted by the client that created the memory request (e.g., client 102) or another client.

At 512, original priority-levels of the requests with the VCID are increased to up-leveled priority levels. For example, the up-level module 212 may increase the priority levels 206 of the memory requests 202 having the indication of the VCID 110 from respective original priority-levels to respective up-leveled priority levels. The increase may be based on the up-level amount 210. The memory requests that have their priority levels 206 increased may include memory requests that were received over the VC corresponding to the VCID 110 along with memory requests related to the memory request 104. Furthermore, the dependency module 120 generally acts on each of the memory requests 202 within the memory-request buffer 122. As such, memory requests that are related to the memory requests 202 that are received over the VC corresponding to the VCID 110 may also have their priority levels 206 up-leveled.

At 514, a determination is made as to whether the up-level indication is still being asserted. For example, the up-level module 212 may determine if the up-level indication 208 is still being asserted by the client 102. If the up-level indication 208 is no longer being asserted ("NO" at 514), then at 516, the up-leveled priority levels are returned to the original priority-levels. For example, the up-level module 212 may decrease the priority levels 206 of the memory requests 202 having the indication of the VCID 110 from the up-leveled priority levels to the respective original priority-levels (including the related memory requests that have the VCID indicated). If the up-level indication is still being asserted ("YES" at 514), then the up-leveled priority levels persist, and the method proceeds to 518.

Irrespective of the priority level (e.g., whether step 516 is performed or not), at 518, the memory request is granted. For example, the memory controller 106 may write data to, or read data from, the memory 108 in accordance with the memory request 104. As discussed above, because priority level is one factor for use in memory-request arbitration, other factors may be utilized for memory grants, which can lead to the memory request being granted while the priority level is up-leveled or at its original value. Generally, however, the up-leveled priority levels may cause an arbiter to grant the corresponding memory requests sooner than if the priority levels are not up-leveled. In other words, while priority up-leveling can increase chances of grant, conditions may change between when the up-level indication is asserted and a time of grant. In such cases, a client may decide that the up-leveled priority level may be returned to the original priority-level before the memory request is granted. As such, the memory request may be granted with the original priority-level. Noted that the process may send the priority levels to another entity that grants (or arbitrates on) the request and the other memory-requests within the memory-request buffer 122.

The preceding discussion describes a method relating to memory-request priority up-leveling. Aspects of these methods may be implemented in hardware (e.g., fixed logic circuitry), firmware, software, or any combination thereof. These techniques may be realized using one or more of the entities or components shown in FIGS. 1-3, which may be further divided, combined, and so on. Thus, these figures illustrate some of the many possible systems or apparatuses capable of employing the described techniques. The entities and components of these figures generally represent software, firmware, hardware, whole devices or networks, or a combination thereof. Furthermore, although the preceding discussion describes acceleration of memory requests through priority up-leveling, the techniques described above can easily be applied to deceleration of memory requests through priority down-leveling. In such cases, the up-level indication 208 may be a level indication, the up-level amount 210 may be a level amount (plus or minus), and the up-level module 212 may be a level module. In such implementations, the priority levels 206 may be increased or decreased depending on whether the level amount is positive or negative.

EXAMPLES

Example 1: A method for memory-request priority adjustment (e.g., memory-request priority up-leveling or memory-request priority down-leveling) performed by a memory controller, the method comprising: receiving a memory request from a client over a virtual channel, VC, the memory request having an original priority-level; adding the memory request to a memory-request buffer along with: an indication of a virtual channel identification, VCID, of the VC; and the original priority-level for the memory request; determining that an adjustment indication (e.g., up-level indication) corresponding to the VCID is asserted; and increasing or decreasing the original priority-level of the memory request to an adjusted priority level (e.g., up-leveled priority level) based on the asserted adjustment indication.

Example 2: The method of example 1, wherein the adjustment indication is asserted via a side channel to the memory controller.

Example 3: The method of example 1 or example 2, wherein the adjustment indication is asserted from the client or another client using the VC.

Example 4: The method of any preceding example, further comprising determining an adjustment amount (e.g., up-level amount) comprising: an amount by which to increase or decrease the original priority-level; or a value for the adjusted priority level.

Example 5: The method of any preceding example, further comprising: determining that the adjustment indication is no longer asserted; and responsive to the determining that the adjustment indication is no longer asserted, returning the adjusted priority level of the memory request to the original priority-level.

Example 6: The method of any preceding example, further comprising granting the memory request based on the adjusted priority level. Alternatively, the method of any preceding example may further comprise, subsequent to, or in response to, the indication that the memory request has timed out, forwarding the memory request for arbitration by another entity.

Example 7: The method of any preceding example, wherein the original priority-level is assigned by the client.

Example 8: The method of any preceding example, wherein the VC is based on the client.

Example 9: The method of any preceding example, further comprising determining if another memory request in the memory-request buffer is related to the memory request.

Example 10: The method of example 9, wherein determining if another memory request is related to the memory request comprises comparing a transaction identification of the memory request to respective transaction identifications for other memory-requests within the memory-request buffer.

Example 11: The method of example 9, wherein determining if another memory request is related to the memory request comprises comparing one or more memory addresses of the memory request to respective memory addresses for other memory-requests within the memory-request buffer.

Example 12: The method of example 10 or 11, wherein the other memory-requests were received over one or more VCs that are different than the VC.

Example 13: The method of any one of examples 10 to 12, further comprising, responsive to determining that one of the other memory-requests is a related memory request that is related to the memory request, assigning the VCID to the related memory request.

Example 14: The method of any preceding example, further comprising: determining that one or more other memory-requests within the memory-request buffer have an indication of the VCID; and increasing or decreasing, based on the adjustment indication, respective original priority-levels of the other memory-requests to respective adjusted priority levels.

Example 15: A memory controller configured to perform the method of any preceding claim. For example, the memory controller may comprise: at least one processor; and at least one computer-readable storage media device comprising instructions that, when executed by the at least one processor, cause the processor to perform the method of any preceding example.

Example 16: An apparatus comprising: a processor; a computer-readable storage media; and executable instructions that cause the apparatus or a memory controller of the apparatus to perform the method of any of examples 1-14.

Example 17: A computer-readable storage medium containing instructions that, when executed by one or more processors, cause the one or more processors to perform the method of any of examples 1-14. The computer-readable storage medium of this example may be a transitory or a non-transitory computer-readable storage medium.

Although implementations of memory-request priority up-leveling have been described in language specific to certain features and/or methods, the subject of the appended claims is not necessarily limited to the specific features or methods described. Rather, the specific features and methods are disclosed as example implementations for memory-request priority up-leveling. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method for memory request priority adjustment performed by a memory controller, the method comprising:
   receiving a memory request from a client over a virtual channel, VC, the memory request having an original priority-level;
   adding the memory request to a memory request buffer along with:
      an indication of a virtual channel identification, VCID, of the VC; and
      the original priority-level for the memory request;
   determining if another memory request in the memory request buffer is related to the memory request by comparing a transaction identification of the memory request to respective transaction identifications for other memory requests within the memory request buffer or comparing one or more memory addresses of the memory request to respective memory addresses for other memory requests within the memory request buffer;

determining that an adjustment indication corresponding to the VCID is asserted; and increasing or decreasing the original priority-level of the memory request to an adjusted priority level based on the asserted adjustment indication.

2. The method of claim 1, wherein the adjustment indication is asserted via a side channel to the memory controller.

3. The method of claim 1, wherein the adjustment indication is asserted from the client or another client using the VC.

4. The method of claim 1, further comprising determining an adjustment amount comprising:
- an amount by which to increase or decrease the original priority-level; or
- a value for the adjusted priority level.

5. The method of claim 1, further comprising:
determining that the adjustment indication is no longer asserted; and
responsive to the determining that the adjustment indication is no longer asserted, returning the adjusted priority level of the memory request to the original priority-level.

6. The method of claim 1, further comprising granting the memory request based on the adjusted priority level.

7. The method of claim 1, wherein the original priority-level is assigned by the client.

8. The method of claim 1, wherein the VC is based on the client.

9. The method of claim 1, wherein the other memory requests were received over one or more VCs that are different than the VC.

10. The method of claim 1, further comprising, responsive to determining that one of the other memory requests is a related memory request that is related to the memory request, assigning the VCID to the related memory request.

11. The method of claim 1, further comprising:
determining that one or more other memory requests within the memory request buffer have an indication of the VCID; and
increasing or decreasing, based on the adjustment indication, respective original priority-levels of the other memory requests to respective adjusted priority levels.

12. A memory controller comprising:
an interface configured to operably couple the memory controller to a client via a virtual channel (VC);
a memory request buffer; and
a memory request priority-level adjustment module configured to:
receive a memory request from the client over the VC, the memory request having an original priority-level;
add the memory request to the memory request buffer along with:
an indication of a virtual channel identification, VCID, of the VC; and
the original priority-level for the memory request;
determine if another memory request in the memory request buffer is related to the memory request by comparing a transaction identification of the memory request to respective transaction identifications for other memory requests within the memory request buffer or comparing one or more memory addresses of the memory request to respective memory addresses for other memory requests within the memory request buffer;
determine that an adjustment indication corresponding to the VCID is asserted; and
increase or decrease the original priority-level of the memory request to an adjusted priority level based on the asserted adjustment indication.

13. The memory controller of claim 12, wherein the adjustment indication is asserted via a side channel to the memory controller.

14. The memory controller of claim 12, wherein the adjustment indication is asserted from the client or another client using the VC.

15. The memory controller of claim 12, wherein the memory request priority-level adjustment module is further configured to determine an adjustment amount for the memory request based on:
an amount by which to increase or decrease the original priority-level; or
a value for the adjusted priority level.

16. The memory controller of claim 12, wherein the memory request priority-level adjustment module is further configured to:
determine that the adjustment indication is no longer asserted; and
responsive to the determination that the adjustment indication is no longer asserted, return the adjusted priority level of the memory request to the original priority-level.

17. The memory controller of claim 12, wherein the memory controller is configured to grant the memory request based on the adjusted priority level.

18. The memory controller of claim 12, wherein:
the original priority-level is assigned by the client; or
the VC is based on the client.

19. The memory controller of claim 12, wherein the other memory requests were received over one or more other VCs that are different than the VC.

20. The memory controller of claim 12, wherein the memory request priority-level adjustment module is further configured to:
in response to determining that one of the other memory requests is a related memory request that is related to the memory request, assign the VCID to the related memory request.

* * * * *